(12) United States Patent
Cornelsen

(10) Patent No.: US 11,328,264 B2
(45) Date of Patent: May 10, 2022

(54) SYSTEM AND METHOD FOR VISUALLY FACILITATED CONTACT INTERACTION MANAGEMENT

(71) Applicant: Juggle, Inc., Fort Worth, TX (US)

(72) Inventor: John Cornelsen, Fort Worth, TX (US)

(73) Assignee: Juggle, Inc., Fort Worth, TX (US)

(*) Notice: Subject to any disclaimer, the term of this patent is extended or adjusted under 35 U.S.C. 154(b) by 719 days.

(21) Appl. No.: 15/096,231

(22) Filed: Apr. 11, 2016

(65) Prior Publication Data

US 2016/0300194 A1    Oct. 13, 2016

Related U.S. Application Data

(60) Provisional application No. 62/145,858, filed on Apr. 10, 2015.

(51) Int. Cl.
    *G06Q 10/10*     (2012.01)
    *A63F 13/537*    (2014.01)
    *A63F 13/85*     (2014.01)

(52) U.S. Cl.
    CPC ....... *G06Q 10/1097* (2013.01); *A63F 13/537* (2014.09); *A63F 13/85* (2014.09)

(58) Field of Classification Search
    CPC .... G06Q 10/1097; A63F 13/537; A63F 13/85
    USPC ...................................................... 705/7.21
    See application file for complete search history.

(56) References Cited

U.S. PATENT DOCUMENTS

| | | | |
|---|---|---|---|
| 7,506,026 B1 | 3/2009 | Lance et al. | |
| 8,185,426 B1 | 5/2012 | Khoubyari | |
| 8,766,793 B2 | 7/2014 | Elumalai et al. | |
| 8,767,948 B1 | 7/2014 | Riahi et al. | |
| 8,819,169 B2 | 8/2014 | Kinder et al. | |
| 2009/0288007 A1* | 11/2009 | Leacock | H04L 67/38 715/716 |
| 2010/0246800 A1* | 9/2010 | Geppert | H04W 4/21 379/265.09 |
| 2011/0296004 A1* | 12/2011 | Swahar | H04L 43/08 709/224 |

(Continued)

OTHER PUBLICATIONS

Eick, Stephen G., and Daniel E. Fyock. "Visualizing corporate data." AT&T technical journal 75.1 (1996): 74-86.*

*Primary Examiner* — Timothy Padot

(57) ABSTRACT

The current invention discloses improved systems and processes for visually incentivizing a user to interact with associated contacts. The system includes a server having a contact database of a plurality of contact records associated with the user, the contact records having information such as contact information. Contact record metadata such as prior contact interaction history is associated with each contact record. A composite weighting factor is assigned to each contact record based on user configurable weighting factors, such as date of the last contact interaction. A game metaphor simulating an actor performing a task where a person is interacting with a distance object is presented, the visualization visualizing the user as the actor, each contact visualized as the distant object, and the distance of the distant object scaled proportionally according to the assigned weighting factor of the corresponding contact. The system monitors for user interaction with the visualization interface or contact interaction over a communication device and rewards the user.

23 Claims, 8 Drawing Sheets

(56) References Cited

U.S. PATENT DOCUMENTS

2012/0226736 A1* 9/2012 Falchuk ............... G06F 9/5061
　　　　　　　　　　　　　　　　　　　　　　709/203
2013/0055157 A1　 2/2013 Park et al.
2013/0191458 A1* 7/2013 Krishnan ............... H04L 67/22
　　　　　　　　　　　　　　　　　　　　　　709/204
2014/0220543 A1* 8/2014 Dohring ............... G09B 19/06
　　　　　　　　　　　　　　　　　　　　　　434/362

* cited by examiner

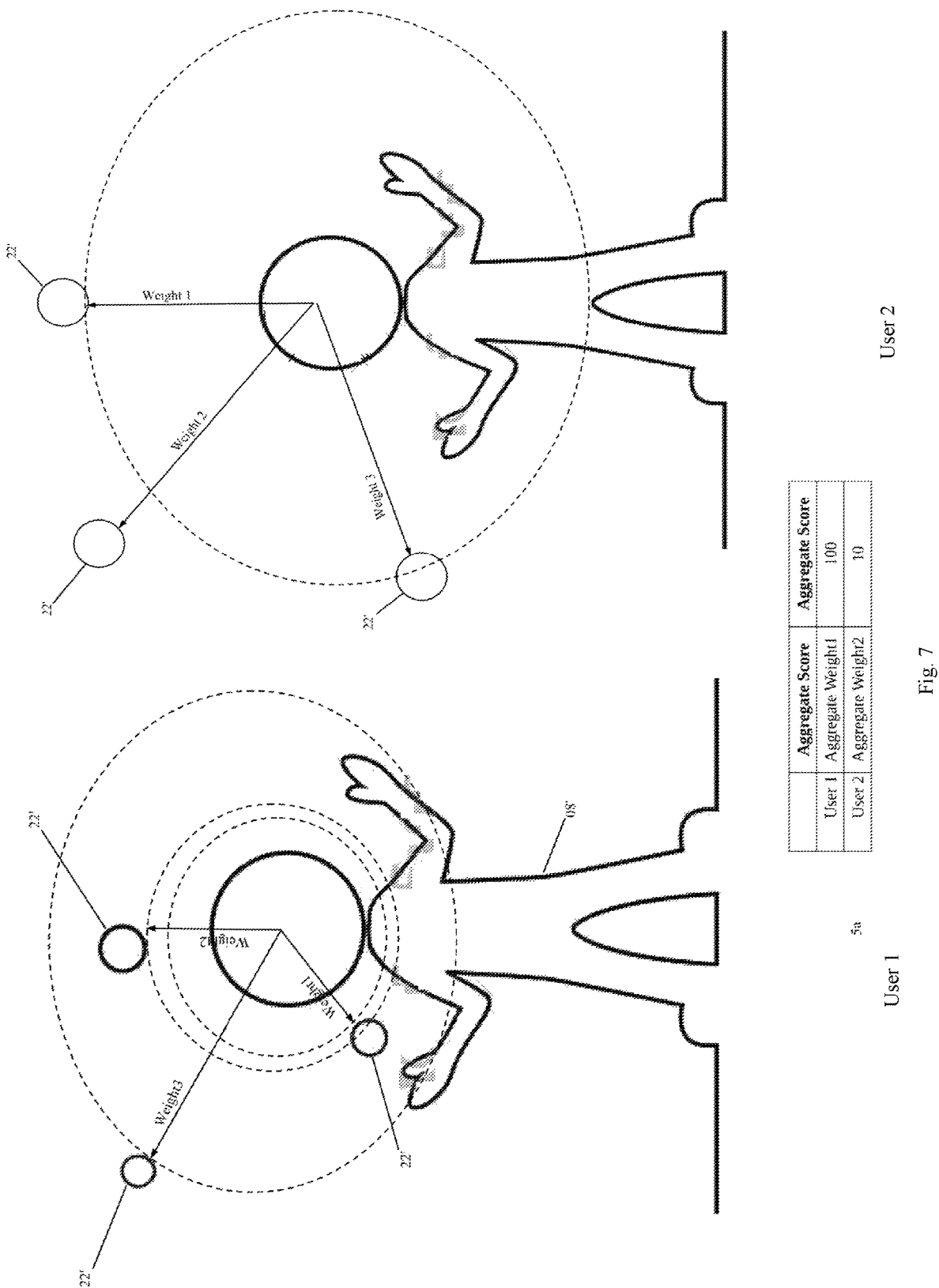

SYSTEM AND METHOD FOR VISUALLY FACILITATED CONTACT INTERACTION MANAGEMENT

BACKGROUND

I. Field of the Invention

The present invention relates to a system and method for facilitating user interaction with associated contacts, more specifically to a system and method for incentivizing contact interaction by visual presentation and interaction.

II. Description of Related Art

At times, people have so many tasks to perform that they cannot easily remember to perform all of them. Some of the tasks include maintaining contact with potential leads, co-workers, colleagues, family, or others. To remind themselves of their tasks, people create systems of reminders. For example, people can create paper or electronic task lists, post sticky notes around their offices and homes, make notes on paper or electronic calendars or planners, set reminder flags on emails, or make other types of reminders.

Even with such reminder systems, people still find it mundane and difficult to remember all of the tasks that they need to perform. In a business setting, this might lead to lost business. In a personal setting, this might lead to loss of relationships. Electronic calendaring and contact management systems can provide such reminders. A contact management system can display a textual alert in order to prompt contact.

However, there are many situations where people do not benefit from such reminders. The reminders are textual which does makes it difficult for the person to prioritize which people. Furthermore, where there is a large contact set, it can be mundane to update and maintain the prioritization over time. What is needed is an alternate system and method of prompting contact interaction.

SUMMARY

The current invention discloses systems and processes for visually incentivizing a user to interact with associated contacts. The system includes a server having a contact database of a plurality of contact records associated with the user, the contact records having information such as contact information. Contact record metadata such as prior contact interaction history is associated with each contact record. A composite weighting factor is assigned to each contact record based on user configurable weighting factors, such as date of the last contact interaction. A game metaphor simulating an actor performing a task where a person is interacting with a distance object is presented, the visualization visualizing the user as the actor, each contact visualized as the distant object, and the distance of the distant object scaled proportionally according to the assigned weighting factor of the corresponding contact. The system monitors for user interaction with the visualization interface or contact interaction over a communication device and rewards the user.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Various example embodiments of the present invention are discussed in detail below with reference to the accompanying drawings, in which example embodiments of the present invention are shown. While specific implementations are discussed, this is done for illustration purposes only. A person of ordinary skill in the relevant art will recognize that other components and configurations maybe used without departing from the spirit and scope the present invention. Like numbers refer to like elements throughout.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 7 is a display of the state of multiple users of group for a selected game metaphor.

DESCRIPTION

It is contemplated that any embodiment of a method or composition described herein can be implemented with respect to any other method or composition described herein.

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

Throughout this application, the term "about" is used to indicate that a value includes the standard deviation of error for the device or method being employed to determine the value.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description. Various example embodiments of the present invention are discussed in detail below with reference to the accompanying drawings, in which example embodiments of the present invention are shown. While specific implementations are discussed, this is done for illustration purposes only. A person of ordinary skill in the relevant art will recognize that other components and configurations maybe used without departing from the spirit and scope the present invention. Like numbers refer to like elements throughout.

Figure 1:
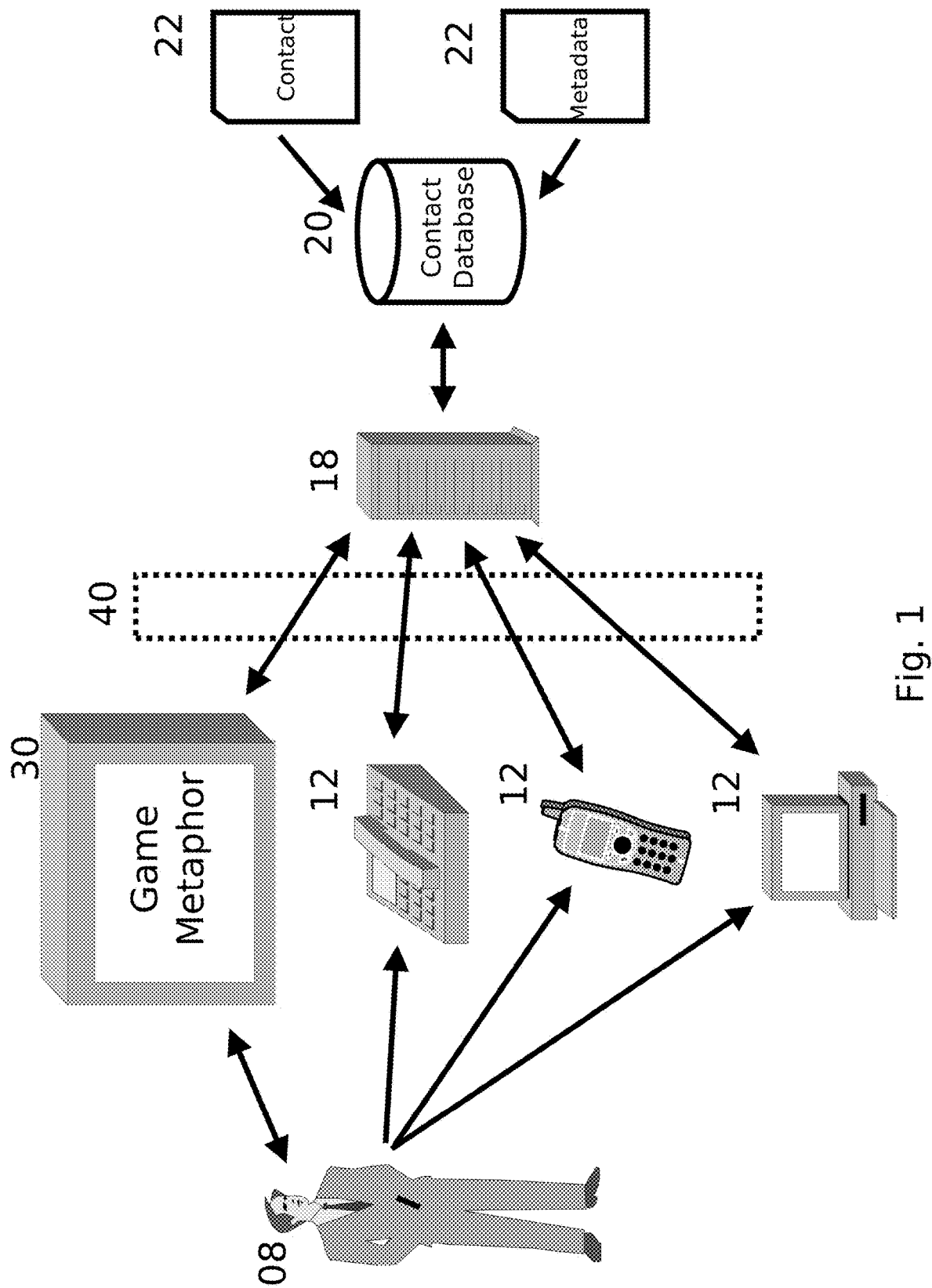
FIG. 1 is a diagram depicting major elements of an embodiment of a system for visually facilitated contact interaction.

Various embodiments of systems and processes of the present invention visually facilitate contact interaction and management thereof. FIG. 1 depicts a server 18 storing a contact database 20 including contact records 22 and contact metadata 22. Based upon the data in the contact database 20, the system 10 presents a visualization interface 30 to the user 08'. The user 08 employs communication devices 12 to contact the subjects of the contact records 22. In certain embodiments, the communication is channeled through an activity monitor 40 that, in turn, updates the visualization interface 30.

The server 18 is computer that includes a CPU, memory, and a data storage device. The data storage device can be any magnetic or optical media, or any other medium for storing electronic data. As would be understood by one skilled in the art, the server 18 can comprise multiple computers working together, and the data storage device can similarly comprise multiple storage devices. The server is embedded with the instruction set of various processes of the current invention.

The server 18 communicates over a network. The exemplary network includes a computer network and a telephone network. The exemplary computer network may be a local area network or wide area network such as the interne. The exemplary telephone network is the circuit-switched telephone network worldwide network of telephone lines, fiber optic cables, microwave transmission links, and cellular networks connected by switching centers, which allows any telephone in the world to communicate with any other. More specifically, it includes a system capable of digital transmission of data over the telephone system.

The server stores a contact database 20, which contains contact records 22 and contact metadata 22. Contact records 22 and contact metadata 22 correspond to people with whom a user 08 might communicate. They may correspond to an account 08 of that user 08. Contact records 22 can contain the name of a contact and contact information such as mailing addresses, telephone numbers, email addresses, social media usernames, and the like. Contact metadata 22 can contain information related to that subject of the contact record 22 such as the type of relationship (e.g. business, personal, familial), prior contact history (e.g. contact dates, contact mode, contact length, subject of interaction), prior interaction types (e.g. sales, referrals, mentoring, counseling, networking, educational, employment), or other information such as metrics (e.g. sales volume, number of referrals, employment leads).

A user 08 may employ a variety of means and communication devices 12 to interact with the subject of the contact records 22. Representative modes of interaction can include a live meeting, mail, telephone calls, email, text messaging, instant messaging (e.g. via an "app" or otherwise), video calls, or other means known in the art. Representative communications devices 12 for contact interaction include desktop computers, laptop computers, smartphones, wireless devices such as cellular telephones, personal digital assistants, portable computing devices, and the like.

Certain embodiments include an activity monitor 40. The activity monitor 40 is a module for communication monitoring activity over a network. The activity monitor 40 is communicatively interposed inline between the communication device 12 and the outbound network node. The activity monitor 40 may contain one or more modules to monitor and log contact interaction. In exemplary configuration, the activity monitor 40 modules correspond to the mode of contact interaction. For example, where an expected mode of contact interaction is via email, the activity monitor 40 modules may comprise a module cooperatively working with the email messaging service operable to capture to sender and recipient email addresses for processing and logging. For example, where an expected mode of contact interaction is via telephone call, the activity monitor 40 modules may comprise a module cooperatively working with the PBX or other telephone equipment operable to capture to sender and recipient telephone numbers for processing and logging.

The visualization interface 30 is an interface for display to and interaction with a user for whom contact interaction management is being facilitated. The visualization interface 30 illustrates priority of interaction among a plurality of subjects of contact records 22. In exemplary configuration, the visualization interface 30 is displayed on an interface where the user can readily interact with it. More disclosure of the visualization interface 30 is below.

Figure 2:
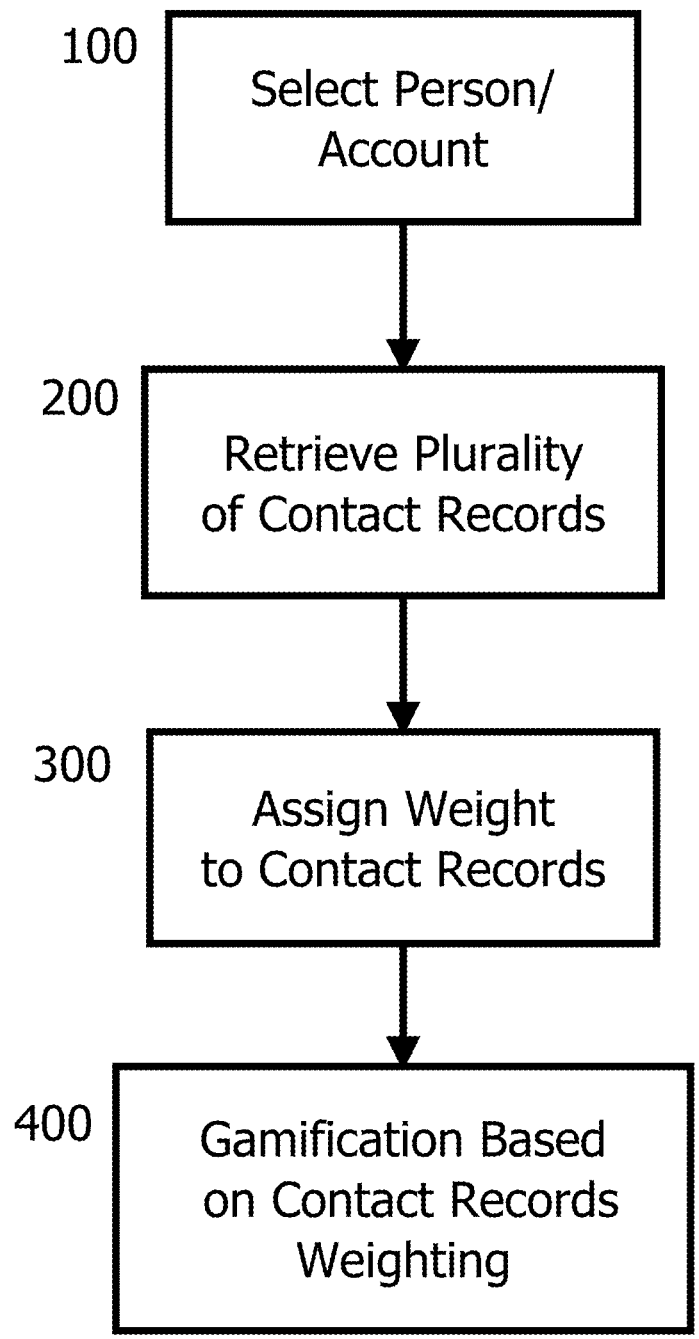
FIG. 2 is a flow chart depicting major steps of an embodiment of a process of visually facilitated contact interaction.

FIG. 2 depicts a process of an embodiment of the current invention for facilitating contact interaction management. At step 100, a person or account for whom contact interaction is being measured is selected. At step 200, one or more contact records associated with that person is retrieved. At step 300, relative weighting is assigned to those contact records. At step 400, gamification based on the weighting is initiated. More consideration to each of the steps will be given below.

At step 100, a person 08 or account 08 for whom contact interaction is being monitored is selected. A user 08 is one who may manage contact interaction with other people. As used within this specification, a user 08 may also be referred to as an account 08. For example, a user 08 may choose to have multiple accounts 08, one for business, one for friends, and one for family. Each account 08 and the associated contacts records 22 are optionally segregated. Additionally, the system can retrieve and store information about the user such as name, birthday, occupation, employer, group memberships, friends, family, personal interests, and other identifying information.

At step 200, a plurality of contact records 22 associated with that person 08 is retrieved from the contact database 22. The contact records may already exist in the contact database 20, be manually input into the contact database 20, or retrieved from third party sources such as contact lists, address books, customer relationship management systems, LINKEDIN, FACEBOOK, ACT, SALESFORCE.COM, SAP, MICROSOFT DYNAMICS, INSTAGRAM, TWITTER, and or other software, APIs, or websites.

Figure 4:
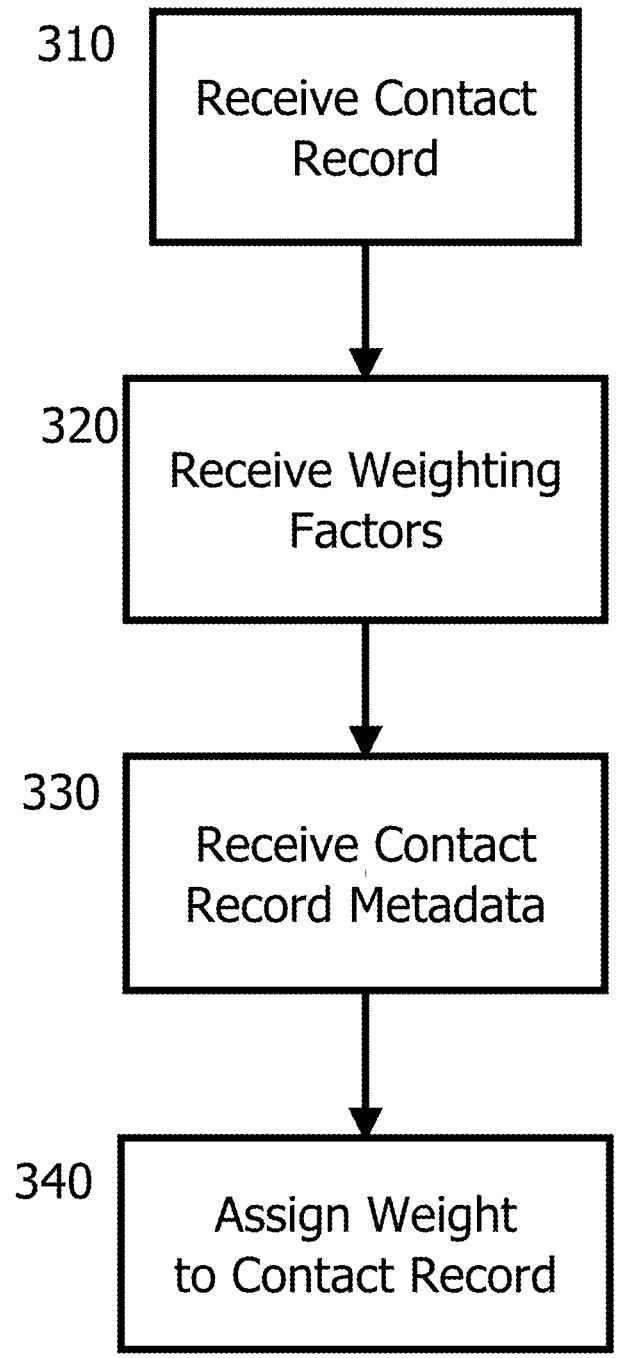
FIG. 4 is a flow chart depicting major steps of an embodiment of a process of assigning weight to contact records.

FIG. 4 illustrates a process of assigning relative weights to the contact records 300. At step 310, one of the received plurality of contact records 22 is processed. At step 320, weighting factors for the subject contact record 22 are determined. Weighting factors are numeric data used to rank a contact records, individually or averaged with other weighting factors. Representative weighting factors include a user assigned importance value, a user input target contact interval, the time since prior interactions, prior interaction types, sales resulting from prior interactions, referrals resulting from prior interactions, connection suggestions from prior interactions, employment applications or leads from prior interactions, company size by employee or sales volume of the subject of the contact record, or similar weighting factors. The weighting factors are averaged together, weighted or otherwise, according to the settings. The averaged weighting factors may be scaled or otherwise correlated. For example, the averaged weighting factor may be inverted such that a high averaged weighting factor yields a low numeric value. In other words, in that approach, a lower numeric value would indicate a higher ranking. It is within the scope of this invention for the user to assign weighting factors or a third party such as website operator, management, or external third party to select weighting factors.

Furthermore, it is within the scope of this invention to vary the weighting over time. For example, the system can compare the user assigned importance value with the historical user activity in order to provide additional system feedback for weighting factor determination or alert the user of the difference between the user assigned importance and contact interaction. Temporal weight factors are also within the scope of the invention. For example, the system may receive GPS, routing, or calendar information in order to determine where the user will be located. In comparison with the address or other position information of the contact, a temporal higher weighting factor can be assigned.

At step 330, contact record metadata 22 necessary to evaluate the weight factors is retrieved. Representative contact metadata 22 includes the type of relationship, prior contact interactions (e.g. contact dates, contact mode, contact length, subject of interaction), prior interaction types (e.g. sales, referrals, mentoring, counseling, networking, educational, employment), prior interaction results, (e.g. sales volume, number of referrals, employment leads). The contact records metadata 22 may already exist in the contact database 20, be manually input into the contact database 20, or retrieved from third party sources such as governmental sources, open data, customer relationship management systems, FACEBOOK, INSTAGRAM, TWITTER, SNAPCHAT, LINKEDIN, ACT, SALESFORCE.Com, SAP, MICROSOFT DYNAMICS, or other sources.

Figure 3:
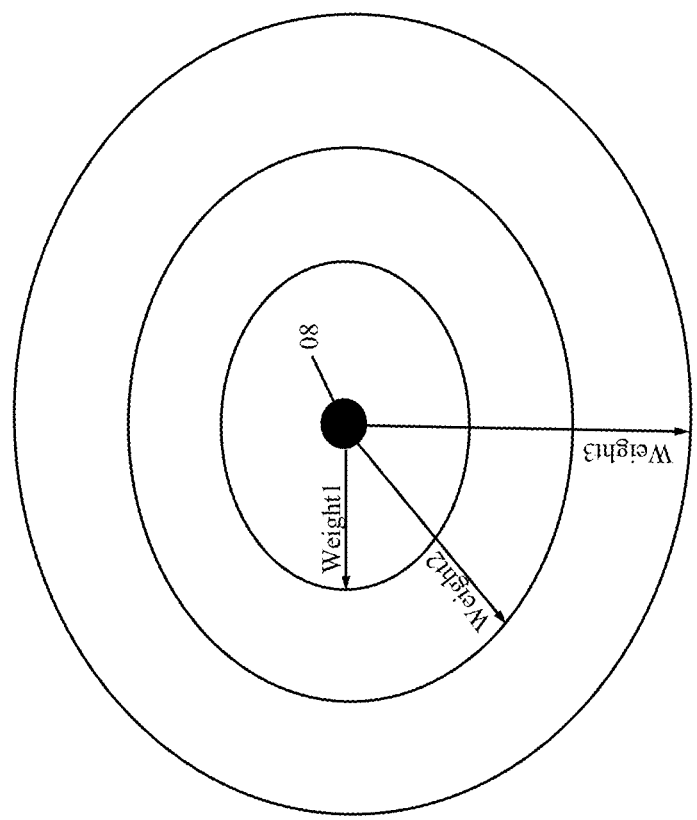
FIG. 3 is a chart depicting a representative basis for visualizing contact weighting.

At step, 340, composite weighting factors are assign to each contact record 22. FIG. 3 illustrates relative composite weighting factor indicators for a plurality of contact records 22 and based on retrieved contact metadata 22. Furthermore, the system can aggregate weighting factors for one or more users. For instance, the system may add the weighting factors across the contacts assigned to a user for a total or average. For instance, the system may add the weighting factors to total weighting factors across the contacts assigned to a group of users.

Figure 6:
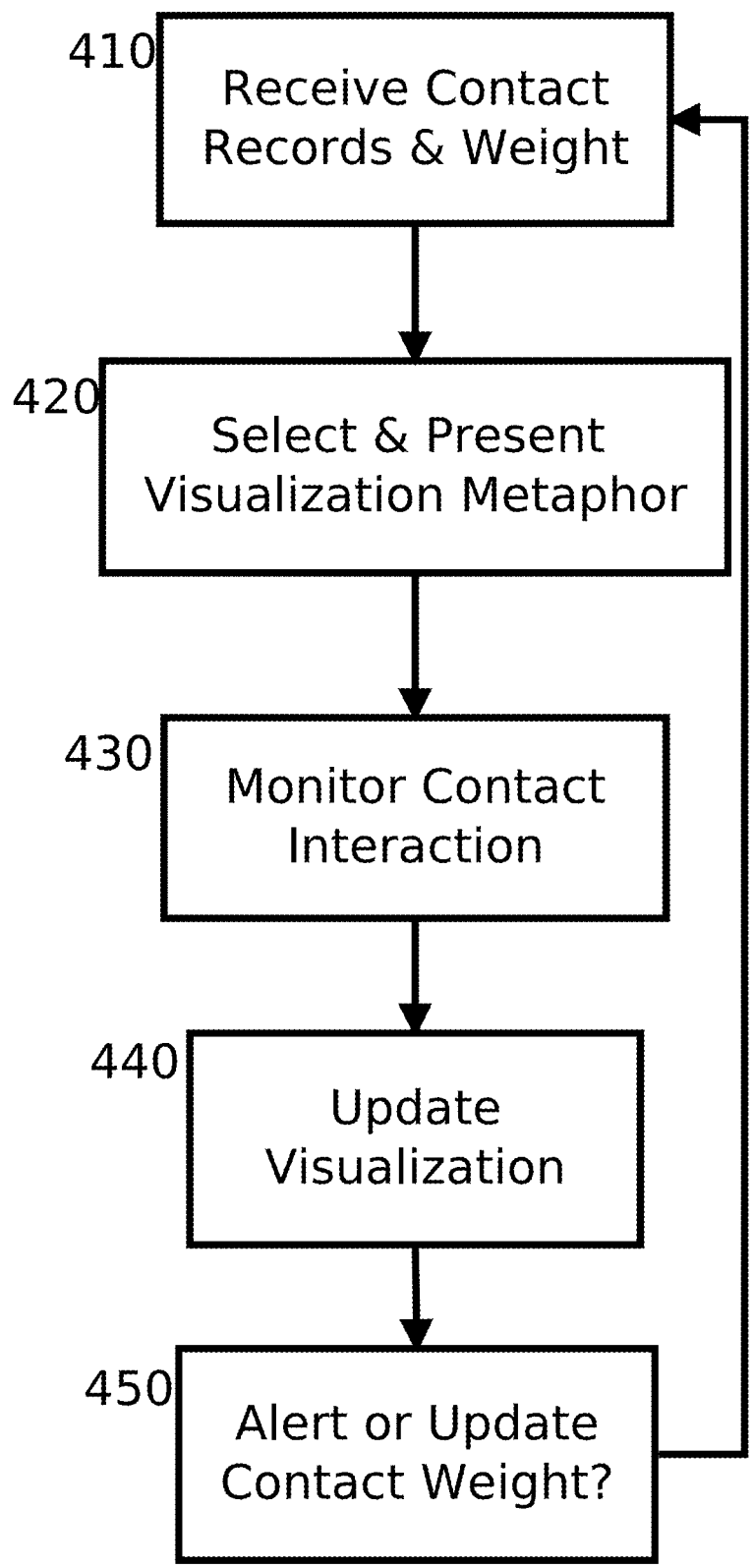
FIG. 6 is a flow chart depicting major steps of an embodiment of a process of gamification based contact interaction management.

At step 400, gamification based on the contact records 22 begins. FIG. 6 illustrates a representative gamification process. At step 410, the plurality of contact records 22, the contact metadata 22, and the composite weighting factors are received.

Figure 5A:
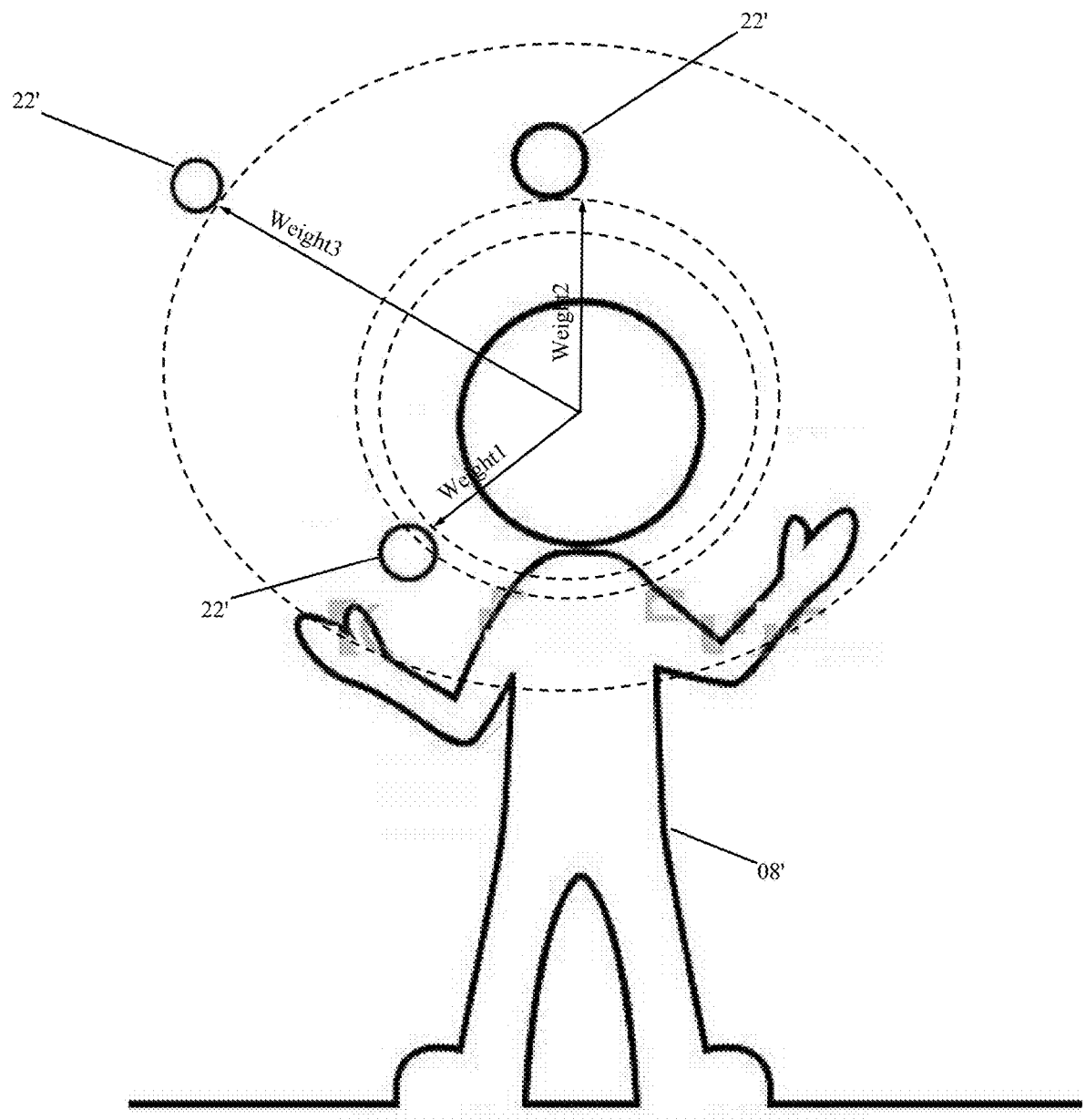
FIGS. 5*a* and 5*b* are representative game metaphors of the current invention.
Figure 5B:
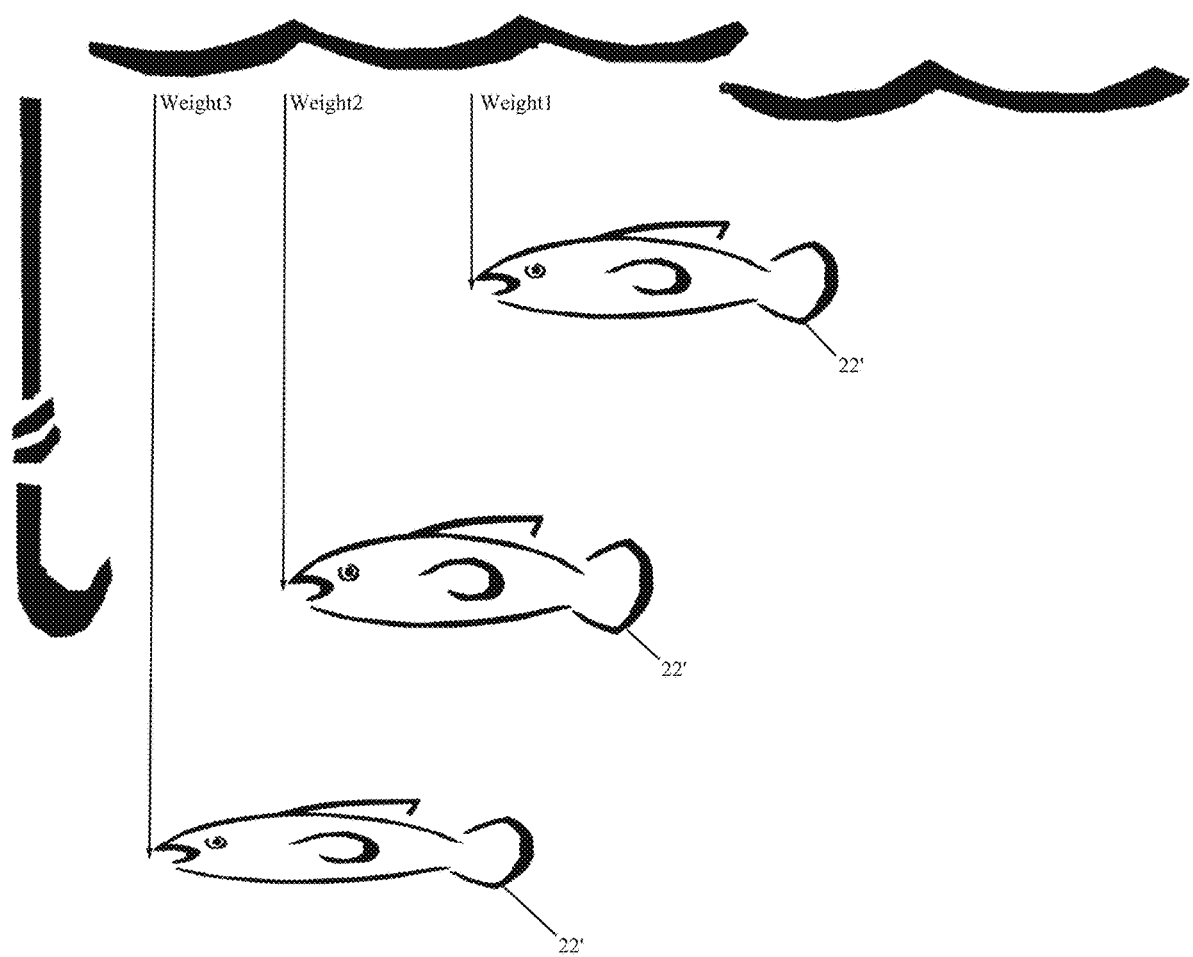

At step 420, a game metaphor is selected for presentation and possible interaction with the visualization and the subject contacts. FIGS. 5a and 5b illustrate representative, non-limiting examples of game metaphors. Suitable game metaphors include those activities which involve an actor performing a task where the person is interacting with a distance object. In the visualization of the selected game metaphor 420, the user 08/account 08' is visualized as the actor 08', each contact 22 is visualized as the distant object 22', and the distance of the distant object 22 is scaled proportionally according to the assigned composite weighting factor of the corresponding contact 22. The game metaphor of FIG. 5a presents the user 08 as a juggler 08', each contact 22 being a ball 22' as the distant object 22', and the distance of the balls 22' from the juggler 08' is proportional to the weighting factor of the corresponding contact 22. The game metaphor of FIG. 5b presents the user 08 as a fisherman (not shown) above the water line, each contact 22 being a fish 22' as the distant object 22', and the distance of the fish 22' from the water line 08' is proportional to the weighting factor of the corresponding contact 22. As previously mention, other suitable game metaphors may be selected and presented. For instance, another game metaphor presents the user as a marksman at a shooting range, each contact being a target as the distant object, and the distance of the target from the marksman is proportional to the weighting factor of the corresponding contact.

At step 420, the selected game metaphor 30 is presented to the user. That presentation is a snapshot of the user's 08' interaction with the contacts at a point in time and is intended to provide incentive for interaction with the contact 22. As disclosed, the distance objects 22' represent the contacts. The visualization of the distant objects may include "hover" or "click" actions. When the user hovers over the distance object 22', the system presents contact record 22 information, contact metadata 22 information, or weighting factor information. When the user selects or clicks the distance object 22', the system presents the contact information for the user to interact with the contact via a communication device 12, optionally transmitting the contact information and launching the contact interaction.

At step 430, the system monitors the visualization interface 30 or activities such as hover action, click interaction, or contact interaction via a communication device 12. Embodiments including the activity monitor 40 may log the contact interaction. Other embodiments may receive manual input of the contact interaction.

In some embodiments, periodically, the system can retrieve the historical contact interactions logged by the activity monitor 40 in order to compare the historical contact interval with the user input importance value for the contact. In certain embodiments, the system ignores the user input importance value and updates the assigned weight 450. In other embodiments, the user is alerted when his behavior is outside a threshold contact interaction interval corresponding to the user input importance value 450. The alert interface presented to the user can prompt the user to initiate a contact interaction with the contact, remind the user of the difference at a later period, or terminate alerts for this contact.

Certain embodiments provide adjustment values to adjust the weight based on the contact interaction. Different contact interaction types or contact categories can be assigned different adjustment values. For example, a text message, an email, a telephone call, physical meeting contact interaction types can be assigned different adjustment values. For example, contact interaction frequency ranges can be assigned different adjustment values. For example, contact interaction with certain contact categories, such as business or friends, can be assigned different adjustment values. For example, contact interaction dates, such as birthdays, holidays or conference dates, can be assigned different adjustment values. The adjustment values are used to increment or decrement the weight value of a contact.

The system may provide rewards such as points, reporting for management consideration, or other rewards. These can be included in leaderboards, or awards such as badges or special recognition or may be tied to financial incentives, such as bonuses. In some embodiments, achieving a certain point level or winning a competition between first and second or more users will unlock additional features of the system. At step 440, the contact database 20 is updated based on the contact interaction. The visualization interface is updated based on the updated contact information.

FIG. 7 illustrates an alternate aspect of embodiments. Other embodiments include grouping and ranking users 08 by aggregate weighting values or adjustment values. As stated above the system can retrieve and store information about the user such as employer, friends, family information. The system can group users for comparison. For example, users might be grouped by employer or family. The system groups the selected user set and ranks the members of that group for display. The ranking may be on aggregate weighting or adjustment values for each member of the group. FIG. 7 illustrates the visualization for multiple users for ready comparison of the state of each user.

Various embodiments of the current invention incentivize a user to initiate contact interactions. In use of the embodiments, a user will have several contacts associated with him or her with whom contact interaction should be improved 200. This will lead to certain state of interaction with those contacts. FIG. 5A depicts a visualization of a representative state of interaction with three contacts, although it might be displayed in tabular form. The visual metaphor shows the "distance" of the contact from him, thus providing a readily perceived form of the distance of that contact, such that incentive is provided for the user to initiate a contact interaction with distant contacts and provides a priority for initiating contact interactions among them. The visualization is updated after the contact interactions thus provided feedback and reinforcing the system provided incentive. Additional system driven incentive is provided by the configurable point assignment for different contact interactions. The relative point assignments can provide incentive to initiate high point value assigned contact interactions. Additional system driven incentive is provided by the grouping and ranking the state of a plurality of individuals. In some embodiments multiple users compete with each other based on their comparative contact initiated scores. Winners of such competitions may receive banners, awards, additional points or whatever reward a user or company desires. In some embodiments, the system unlocks additional features as a user or users accumulates certain levels of points or wins competitions between multiple users. As stated above the system can retrieve and store information about the user such as employer, friends, family information. Grouping and display of the performance of the members of the selected group set can provide ready relative performance of the group members, providing further incentive, as shown in FIG. 7.

While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the present invention.

I claim:

1. A system for visualizing a user's interaction with contacts, the system comprising:
   a. a server comprising memory comprising a contact database comprising
      i. retrieved contact records having contact information for a plurality of contacts associated with the user;
      ii. retrieved contact record metadata having information associated with the contact and prior user to contact interaction;
   b. the server configured to assign user selected weighting factors to the contact records;
   c. the server presenting a game metaphor to user over a visualization interface, the game metaphor simulating an actor performing a task wherein said actor interacts with a plurality of distant objects, the visualization interface visualizing the user as the actor, each contact visualized as one of the plurality of distant objects, and the visualized distance of each distant object scaled proportionally according to the assigned weighting factor of the corresponding contact.

2. The system of claim 1 wherein said metaphor is juggling, with a juggler representing the actor, a ball representing a contact, the distance of said ball from said juggler proportional to the assigned weighting factor of said contact.

3. The system of claim 1 wherein said metaphor is fishing, with a fisherman representing the actor, a fish representing a contact, the distance of said fish from said fisherman proportional to the assigned weighting factor of said contact.

4. The system of claim 1 wherein said metaphor is a shooting range, with a marksman representing the actor, a target representing a contact, the distance of said target from said marksman proportional to the assigned weighting factor of said contact.

5. The system of claim 1, wherein said weighting factor is a function of the duration of the last contact date.

6. The system of claim 1, wherein said weighting factor is a function of at least one of the following: type of relationship and the prior interaction type.

7. The system of claim 1, further comprising an activity monitor configured to monitoring activity over a network, said activity monitor communicatively interposed between a communication device associated with said user and an outbound network node.

8. The system of claim 7, wherein said system is configured to update said assigned weighting factor in response to a contact interaction between said user and said contact.

9. The system of claim 7, wherein said system is configured to assign an adjustment value to a contact interaction type and apply said adjustment value to said assigned weighting factor in response to a contact interaction between said user and said contact.

10. The system of claim 7, wherein said system determines a weighting factor as a function of a threshold contact interaction interval corresponding to a user input importance value, said activity monitor monitors said user's contact interaction with said contact for contact interaction within said contact interval; and alerts said user when no contact interaction occurs within the threshold contact interaction interval.

11. The system of claim 1, wherein said system is configured to determine a score based on at least one variable associated with a contact interaction.

12. The system of claim 1, wherein said at least one variable is selected from duration of contact interaction, frequency of contact interaction, and priority of contact interaction.

13. The system of claim 1, wherein scores from at least a first and second user are compared and wherein a winner between said first and second user is determined based on said scores.

14. A process for visualizing a user's interaction with contacts, the process comprising:
   a. accessing a server comprising memory comprising a contact database comprising retrieved contact records having contact information for a plurality of contacts associated with the user;
   b. retrieving contact record metadata having information associated with the contact and prior user to contact interaction, and
   c. assigning user selected weighting factors to the contact records, the server presenting a game metaphor to user over a visualization interface, the game metaphor simulating an actor performing a task where of a person interacting with a distance object, the visualization visualizing the user as the actor, each contact visualized as the distant object, and the distance of the distant object scaled proportionally according to the assigned weighting factor of the corresponding contact.

15. The process of claim 14, wherein the server presenting a game metaphor comprises presenting a juggling metaphor, with a juggler representing the actor, a ball representing a contact, the distance of said ball from said juggler proportional to the assigned weighting factor of said contact.

16. The process of claim 14, wherein the server presenting a game metaphor comprises presenting a fishing metaphor, with a fisherman representing the actor, a fish representing a contact, the distance of said fish from said fisherman proportional to the assigned weighting factor of said contact.

17. The process of claim 14, wherein the server presenting a game metaphor comprises presenting a shooting range metaphor, with a marksman representing the actor, a target representing a contact, the distance of said target from said marksman proportional to the assigned weighting factor of said contact.

18. The process of claim 14, wherein assigning said weighting factor comprises assigning said weighting factor according to a function of the duration of the last contact date.

19. The process of claim 14 wherein assigning said weighting factor comprises assigning said weighting factor according to a function of at least one of the following: type of relationship and the prior interaction type.

20. The process of claim 14, further comprising monitoring activity over a network using an activity monitor communicatively interposed between a communication device associated with said user and an outbound network node.

21. The process of claim 20, further comprising updating said assigned weighting factor in response to a contact interaction between said user and said contact.

22. The process of claim 20, further comprising assigning an adjustment value to a contact interaction type and applying said adjustment value to said assigned weighting factor in response to a contact interaction between said user and said contact.

23. The process of claim 20, further comprising determining a weighting factor as a function of a threshold contact interaction interval corresponding to a user input importance value, and monitoring said user's contact interaction with said contact for contact interaction within said contact interval, and alerting said user when no contact interaction occurs within the threshold contact interaction interval.

* * * * *